United States Patent [19]
Axmann

[11] Patent Number: 5,772,006
[45] Date of Patent: Jun. 30, 1998

[54] APPARATUS FOR SINGLING AND/OR SORTING RANDOMLY DELIVERED PARCELS

[75] Inventor: Norbert Axmann, Sinsheim, Germany

[73] Assignee: Axmann Foerdertechnik GmbH, Sinsheim-Steinsfurt, Germany

[21] Appl. No.: 644,343

[22] Filed: May 10, 1996

[30] Foreign Application Priority Data

May 10, 1995 [DE] Germany ............... 195 16 779.1

[51] Int. Cl.⁶ ............................................. B65G 47/80
[52] U.S. Cl. ............................................. 198/831; 198/443
[58] Field of Search ............................................. 198/443, 831

[56] References Cited

U.S. PATENT DOCUMENTS

| | | | |
|---|---|---|---|
| 1,698,786 | 1/1929 | Finn | 198/831 |
| 3,153,475 | 10/1964 | Swanson | 198/831 |
| 3,561,587 | 2/1971 | Schausten | 198/831 |
| 4,852,714 | 8/1989 | Faber, Jr. | 198/443 |
| 4,962,842 | 10/1990 | Limoni | 198/443 |
| 5,044,487 | 9/1991 | Spatafora et al. | 198/443 |
| 5,372,236 | 12/1994 | Layer | 198/443 |

FOREIGN PATENT DOCUMENTS

| | | | |
|---|---|---|---|
| 2611354 | 9/1977 | Germany | 198/831 |
| 4116183 | 11/1992 | Germany | 198/443 |
| 8903016 | 7/1991 | Netherlands | 198/443 |

*Primary Examiner*—Karen M. Young
*Assistant Examiner*—Douglas Hess
*Attorney, Agent, or Firm*—Herbert L. Lerner; Laurence A. Greenberg; Werner H. Stemer

[57] ABSTRACT

Randomly delivered parcels are singled and/or sorted with a central separator which receives a random stream of parcels from a first conveyor. The parcels are removed in single file from the central separator with a second conveyor. The central separator has a semicircular belt curve with a conveyor belt incoming at an incoming-side curve radius and outgoing at a diametrically opposite, outgoing-side curve radius. The first conveyor discharges the parcels randomly into the semicircular belt curve. The second conveyor for removing singled parcels adjoins the belt curve at the outgoing-side curve radius and at a periphery of the belt curve. A return device returns to the belt curve any parcels not directly removed from the belt curve in singled condition. The return device is disposed adjacent the diametrically opposite curve radii and adjacent the second conveyor.

17 Claims, 2 Drawing Sheets

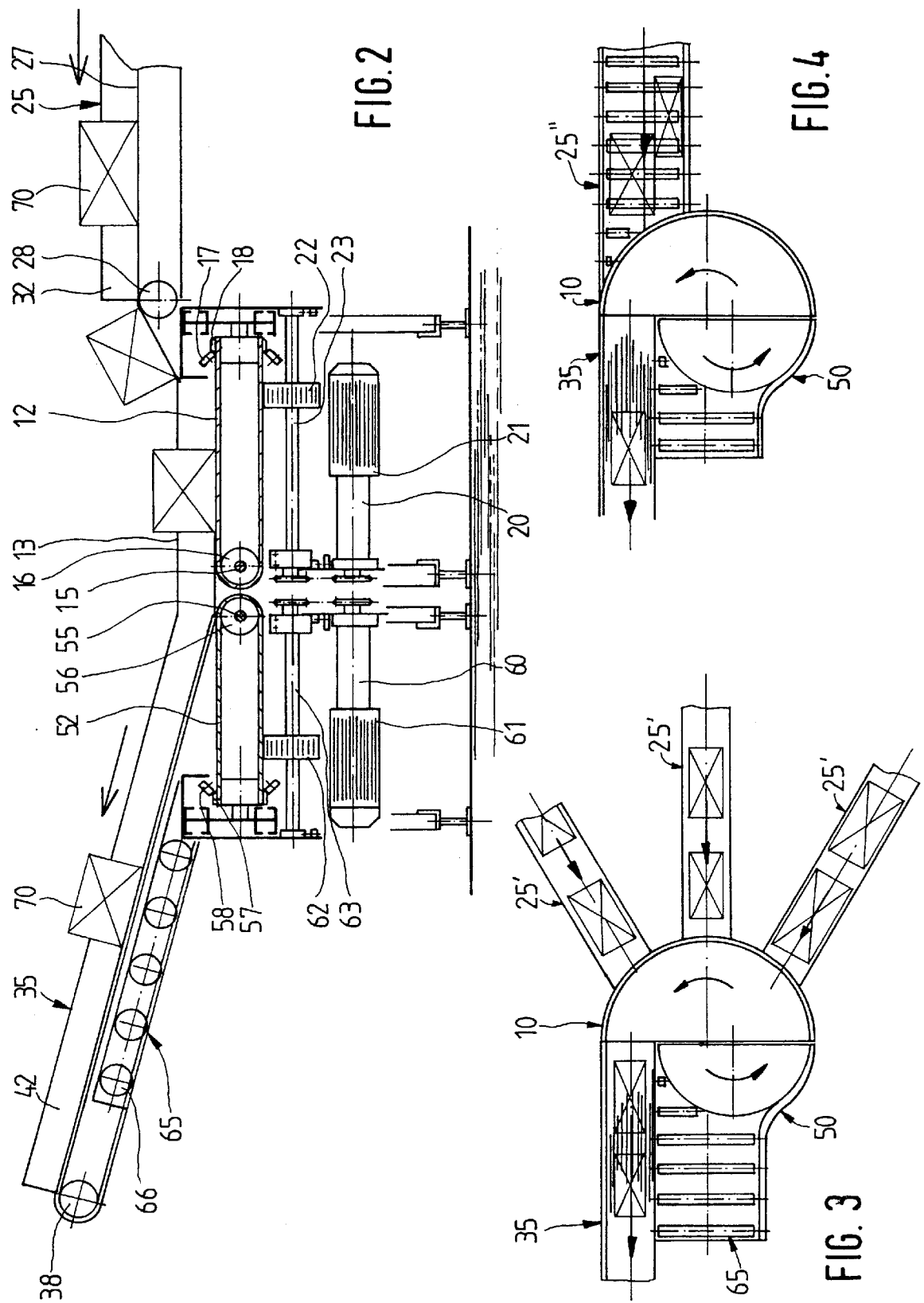

APPARATUS FOR SINGLING AND/OR SORTING RANDOMLY DELIVERED PARCELS

BACKGROUND OF THE INVENTION

1. Field of the Invention

The invention relates to an apparatus for singling and/or sorting randomly delivered parcels, such as small packages; the apparatus has a central separator device, at least one first conveyor device for supplying the parcels to the central separator device, and a second conveyor device for removing the singled parcels from the separator device.

2. Description of the Related Art

An apparatus for aligning and singling randomly delivered elongated articles has become known heretofore from German patent DE 24 39 136 C2. That apparatus has a turntable as its central separator device on which the articles to be sorted are placed by means of a belt conveyor. A guide rail which extends approximately in a spiral from the center to the periphery of the turntable is disposed above the turntable and it is fixed to the frame. As the turntable revolves about its pivot axis, the articles placed on it at random are entrained by the turntable, they slide along the guide rail on the outside, and finally at the edge of the turntable they are transferred, now singled and aligned, to a conveyor belt. The conveyor belt extends away from the turntable at a tangent. The singled and aligned articles are thus removed. The apparatus is intended in particular for aligning randomly delivered chocolate bars.

Because of the fact that the randomly delivered articles are aligned by means of the spiral guide rail, along which the articles slide on the outside as the turntable revolves, the angular speed of the turntable must necessarily be limited such that the centrifugal forces acting on the articles that are to be aligned will not impair the function of the guide rail. In other words, the articles to be aligned should not shift radially outward in response to the centrifugal force. Hence the singling and separating capacity of that prior art apparatus is limited.

International publication WO 86/07040 discloses an apparatus for aligning and sorting parcels with a turntable and a circular conveyor track formed by spaced-apart guide rails, and a further, identical conveyor track extends around the first, being formed by the outer guide rail of the first conveyor track and by a second guide rail spaced apart from the aforementioned outer guide rail. The parcels to be aligned and sorted are delivered randomly to the turntable. The parcels, aligned to a certain extent, enter the first conveyor track via a shunt. The first conveyor track discharges tangentially into a conveyor device for removing the parcels. The conveyor device for removing the aligned articles is assigned a selection station, from which a gate extends to the outer, circular conveyor track.

One of the objects of the last-mentioned apparatus is to remove each of the articles from the separator device with a certain edge facing forward. If a parcel reaching the vicinity of the selection station is not properly aligned, it is rejected and returned via the aforementioned gate to the outer conveyor track of the turntable, from which, now aligned as intended, it again reaches the conveyor device that removes the aligned articles.

The apparatus described in WO 86/07040 is on the one hand complicated in design and expensive, and on the other it is evidently suitable only for aligning and singling mutually identical articles.

SUMMARY OF THE INVENTION

It is accordingly an object of the invention to provide an apparatus for singling and/or sorting randomly delivered parcels, which overcomes the above-mentioned disadvantages of the heretofore-known devices and methods of this general type and which allows successful singling and/or sorting of randomly delivered parcels of entirely different sizes with satisfactory throughput of parcels per unit of time.

With the foregoing and other objects in view there is provided, in accordance with the invention, an apparatus for singling and/or sorting randomly delivered parcels, comprising:

a central separator, a first conveyor randomly supplying parcels to the central separator, and a second conveyor removing the parcels from the central separator;

the central separator including a semicircular belt curve with a conveyor belt incoming at an incoming-side curve radius and outgoing at a diametrically opposite, outgoing-side curve radius; the first conveyor randomly discharging the parcels into the semicircular belt curve;

the second conveyor for removing singled parcels adjoining the belt curve at the outgoing-side curve radius and at a periphery of the belt curve; and a return device for returning to the belt curve any parcels not directly removed from the belt curve in singled condition, the return device being disposed adjacent the diametrically opposite curve radii and adjacent the second conveyor.

In other words, the objects of the invention are satisfied in that the separator device includes a semicircularly embodied 180° belt curve. The conveyor belt is incoming at one curve radius and outgoing in the region of the other curve radius. The first conveyor device for delivering random parcels discharges into the belt curve. The second conveyor device for removing singled parcels adjoins the belt curve in the region of the outer periphery on the outgoing side. A device is used for returning to the belt curve any parcels that have not been directly removed from the belt curve in singled file, which device is disposed such that on the diameter side it borders on the belt curve and is next to the second conveyor device.

While in the relevant prior art turntables have been used as central separator devices, in the invention this purpose is served by a semicircularly embodied 180° belt curve, onto which the material to be sorted is placed randomly and entrained by the revolving conveyor belt of the belt curve. In this entrainment motion, the material being conveyed moves by centrifugal force into the peripheral region of the belt curve and is conveyed away in the region of the outer curve by the conveyor device that adjoins the belt curve on the outgoing side.

If parcels placed randomly on the belt curve do not, as they move along the conveyor track of the belt curve, reach the peripheral region of the belt curve and are not removed by the aforementioned conveyor device directly in singled file, then such parcels reach the return device that directly adjoins the diameter region and they are returned by it to the conveyor belt of the belt curve. In that regard the parcels, little by little, reach the peripheral region of the belt curve and are transported away from it by means of the second conveyor device.

By means of the invention an apparatus for singling and/or sorting randomly delivered parcels is created that is distinguished over the prior art in that most differently sized parcels can be singled and sorted most successfully at a high travel speed and hence with a high singling and/or sorting output.

In accordance with an additional feature of the invention, the device for returning to the belt curve any parcels that have not been directly removed from the belt curve in singled condition likewise comprises a semicircularly embodied 180° belt curve, with a conveyor belt drivable in the same direction as the conveyor belt of the first-mentioned belt curve. The second belt curve is disposed with its rectilinear diameter side directly bordering on the rectilinear diameter side of the first-mentioned belt curve, in such a way that the incoming-side radius of the second belt curve adjoins the outgoing-side radius region of the first belt curve, and the outgoing-side radius of the second belt curve adjoins the incoming-side of the first belt curve.

In the embodiment of the return device with a conveyor belt revolving in the same direction as the conveyor belt of the first-mentioned belt curve, any parcels not directly removed, in singled condition, from the first belt curve by the second conveyor device reach the second belt curve, and are returned by it in the incoming-side region to the conveyor belt of the first belt curve, and then they are transferred in the outer peripheral region of the second belt curve in single file, to the second conveyor device and are removed by it.

In the case of flat parcels, it can happen that several of them are on top of one another, which presents special problems of singling. In this sense it has been found to be advantageous if the second belt curve for returning parcels, not directly removed from the first belt curve in singled condition, back to this first belt curve is pivotally supported, relative to the conveying plane of the first curve, about an articulation axis extending at right angles to the center of the first belt curve in such a way that in the incoming radial region, the conveyor belt of the second belt curve is located below the conveyor belt of the first belt curve, in the outgoing radius side of the latter.

With this kind of arrangement of the second belt curve, its conveying plane extends at an angle to the conveying plane of the first belt curve, and parcels arriving from the latter are thrown onto the incoming-side region of the second belt curve. As a rule, singling of any parcels resting on top of one another will occur, and these parcels are then returned to the first belt curve. As the conveyor belt of the first belt curve revolves, the parcels move to its peripheral region and are then removed, in singled condition, via the second conveyor device.

In another advantageous feature of the invention, for returning any parcels that have not been directly removed from the belt curve in singled condition, the second belt curve has a diameter that is smaller, by approximately the width of the second conveyor device for removing singled parcels, than the diameter of the first belt curve.

Expediently, the second belt curve for returning any parcels that have not been directly removed from the belt curve in singled condition is disposed center-offset from the first belt curve and is dimensioned such that the second belt curve of the conveyor device serving to remove the singled parcels extends as far as the outer edge of the first belt curve remote from the aforementioned conveyor device.

In such an arrangement of the second belt curve immediately next to the second conveyor device for removing singled parcels from the first belt curve, it has also proved to be expedient if the second conveyor device for removing singled parcels extends in the region of the outer curve approximately at a tangent away from the first-mentioned belt curve.

In accordance with a further feature of the invention, the conveyor for delivering a random stream of parcels discharges into the first belt curve at a tangent and/or in a direction counter to the travel direction of the conveyor belt of the first belt curve. Thus, the parcels are delivered in a direction counter to the travel direction of the conveyor belt of the first belt curve.

In accordance with again another feature of the invention, there are provided two or more conveyors for delivering parcels. All such conveyors discharge into the first-mentioned belt curve, so that by means of the apparatus of the invention, even streams of parcels coming from different directions can be combined, and the parcels originating in the various streams of parcels are transported, singled and in ordered fashion, elsewhere by means of the second conveyor.

While it is possible to utilize conveyors of any arbitrary type for delivering the parcels to the separator and for removing singled parcels, conveyor belts have proved to be especially advantageous.

Other features which are considered as characteristic for the invention are set forth in the appended claims.

Although the invention is illustrated and described herein as embodied in a apparatus for singling and/or sorting randomly delivered parcels, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWING

FIG. 2 is a diagrammatic, sectional view taken along the line II—II of FIG. 1;

FIG. 3 is a top-plan view, similar to FIG. 1 but on a reduced scale, of the apparatus with a plurality of conveyor devices for delivering various streams of parcels; and FIG. 4 is a similar view of an apparatus with a conveyor device for delivering parcels that discharges at a tangent into a separator device.

DESCRIPTION OF THE PREFERRED EMBODIMENTS

Figure 1:
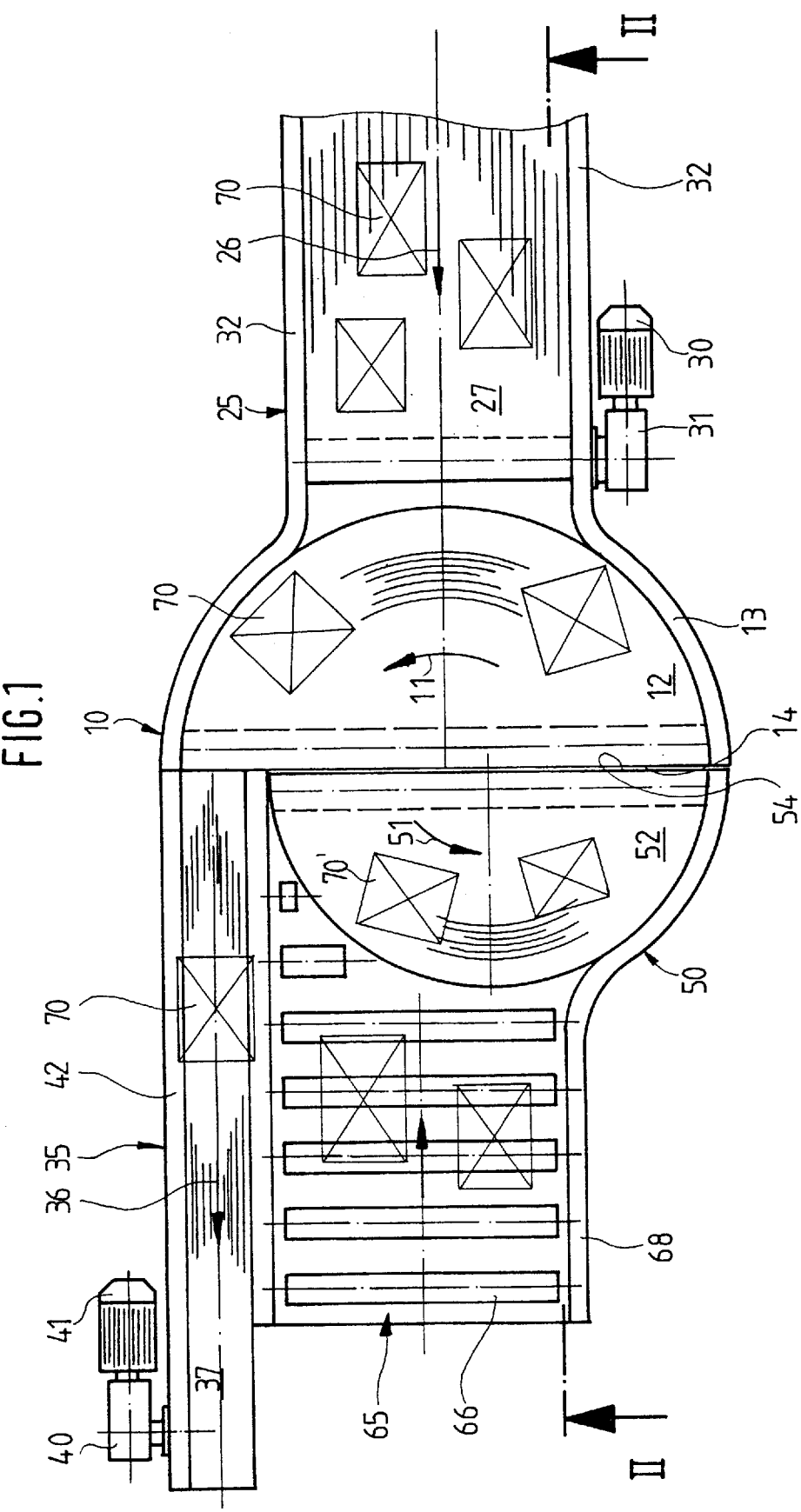
FIG. 1 is a partial top-plan view onto the apparatus for singling and/or sorting randomly delivered parcels.

Referring now to the figures of the drawing in detail and first, particularly, to FIGS. 1 and 2 thereof, there is seen a central separator device formed of a semicircular 180° belt curve 10 with a conveyor belt 12. The belt 12 is driven to revolve in the direction of the arrow 11, and it is surrounded, over a circumferential range of 180°, by a rim 13 that projects upwardly past its conveying plane. The conveyor belt 12 is circular, and in the region of the straight side 14 of the belt curve 10 it is guided via spaced-apart guide rollers 16. The guide rollers 16 have crowned running surfaces and they are freely rotatable on a bearing shaft 15, and also on the outside via support rollers 17. The support rollers 17 are disposed at the rim 13 and from behind engage a peripheral bead 18 that is firmly joined to the conveyor belt 12. The conveyor belt 12 is driven with a friction wheel 22, which is driven by an electric motor 21 via a gear 20 and is received on a drive shaft 23 extending beneath the conveyor belt 12 and which engages the lower run of the conveyor belt 12 in the region of a non-illustrated counterpressure roller.

Belt curves of this type are well known to the skilled artisan and they will therefore not be described here in more detail.

A belt conveyor 25 for randomly delivering parcels of various sizes discharges into the belt curve 10, forming the central separator device, in the direction of an arrow 26. The belt conveyor 25 has an endless conveyor belt 27 with a conveying plane located above that of the conveyor belt 12 of the belt curve 10. The conveyor belt 27 is guided via deflection rollers 28 and is driven by an electric motor 30 via an angle gear 31 operatively connected to a deflection roller 28. Upwardly projecting rims 32 extend from the belt conveyor 25 on both sides along its conveying plane.

Belt conveyors of this type are likewise well known and therefore require no further explanation here.

In the outgoing-side peripheral region of the conveyor belt 12 of the belt curve 10, the straight side 14 thereof is adjoined by a further belt conveyor 35 for removing singled parcels from the belt curve 10 in the direction of the arrow 36. The belt conveyor 35 has an endless conveyor belt 37, which is guided via deflection rollers and is driven by an electric motor 41, also via a gear 40 operatively connected to a deflection roller 38. The belt conveyor 35, which extends uphill from the belt curve 10, has an outer rim 42 that protrudes past its conveying plane and directly adjoins the rim 13 of the belt curve 10.

The apparatus also has a further semicircularly embodied 180° belt curve 50, with a smaller radius, by half the width of the belt conveyor 35 for removing singled parcels, than the radius of the first-mentioned belt curve 10. The second belt curve 50 is fundamentally identical in construction to the first belt curve 10 and it has a conveyor belt 52 that revolves in the direction of the arrow 51.

The conveyor belt 52, on the straight side 54 of the belt curve 50, is guided via spaced-apart guide rollers 56 that have crowned running surfaces and are freely rotatable on a bearing shaft 55. The belt 52 is further supported on the outside via support rollers 57 that engage a peripheral bead 58 of the conveyor belt 52. The conveyor belt 52 is driven with a friction wheel 62, which is driven by an electric motor 61 via a gear 60 and is received on a drive shaft 63 extending beneath the conveyor belt 52 and which engages the lower run of the conveyor belt 52 at a non-illustrated counterpressure roller.

The second belt curve 50, with its straight side 54, directly adjoins the straight side 14 of the first belt curve 10 and its center is offset from the first belt curve 10 (by approx. half the width of the belt 37). The conveyor belt 52 of the second belt curve 50 revolves in the direction of the arrow 51, in the same direction as the conveyor belt 12 of the first belt curve. A roller track 65 is disposed between the obliquely rising belt conveyor 35 for removing singled parcels from the first belt curve 10 and the second belt curve 50. The roller track 65 has freely rotatable rollers 66, which likewise define an obliquely rising course. On the side of the roller track 65 remote from the belt conveyor 35 for removing singled parcels, there is a rim 68, which projects upwardly from the roller track and also surrounds the circumferential region of the second belt curve 50 bordering on the roller track 65. The rim 68 protrudes past the conveying plane of the second belt curve and extends as far as the rim 13 of the first belt curve 10.

Parcels 70 randomly delivered by the first belt conveyor 25 to the first belt curve 10 in the direction of the arrow 26 are engaged by the conveyor belt 12 of the belt curve 10 and they are entrained in a counter-clockwise direction (arrow 11). In view of the forces acting on the parcels 70, these parcels migrate outward on the conveyor belt 12, thus being singled at the same time, and at least some of these parcels 70 are transferred directly in singled condition to the second belt conveyor 35 for removing the parcels, which carries them away from the belt curve 10 in the direction of the arrow 36.

Those parcels 70 that on reaching the outgoing curve radius of the first belt curve are not transferred, in singled condition, to the belt conveyor 35 for removal of the parcels 70 thus reach the second belt curve 50, as suggested by reference numeral 70'. They are accordingly entrained by the belt 52 and returned to the first belt curve 10, at the distal side as seen from the second conveyor device 35 for removing the parcels. In the process, because of the forces acting thereon, the parcels 70 traverse a spiral conveying path back again, and on being entrained by the conveyor belt 12 of the first belt curve 10 they reach the peripheral region thereof, where they are finally transferred to the second belt conveyor 35 and carried away, in singled condition.

Parcels 70 that fail to be gripped precisely, upon the transfer from the first belt curve 10 to the second belt conveyor 35, are only partly entrained by it and finally, via the obliquely rising roller track 65, slip back onto the conveyor belt 52 of the second belt curve 50. Those parcels are thus returned to the first belt curve 10 by means of the second belt curve 50, and on their second trip they reach the peripheral region of the belt curve 10, where they can be removed, having been singled, via the second belt conveyor 35.

FIG. 3 shows a plan view of an apparatus in which three belt conveyors 25' discharge into the first belt curve 10 for delivering various streams of parcels to the separator device. After a suitable trip through the conveying segments of the first belt curve 10, and possibly the second belt curve 50, they are removed, having been singled, via the belt conveyor 35 extending at a tangent away from the first belt curve 10. The apparatus illustrated in FIG. 3 is especially significant in commercial shipping, because it makes it possible to bring together parcels from various departments and to single such parcels as well. The illustration makes it further clear that the term "parcel" is used herein in a quite generic sense, as the goods may be any type of volume packages.

The embodiment shown in FIG. 4 differs from that of FIGS. 1 and 2, on the one hand, and FIG. 3 on the other, in that the conveyor device which is embodied as a roller track 25" discharges at a tangent into the 180° belt curve 10 in such a way that a considerable portion of the parcels delivered by the roller track 25" are transferred directly from the belt curve 10 to a belt conveyor 35 and removed by it. This embodiment is distinguished by an especially high conveying capacity.

I claim:

1. An apparatus for singling and/or sorting randomly delivered parcels, comprising:

a central separator, a first conveyor randomly supplying parcels to said central separator, and a second conveyor removing the parcels from said central separator;

said central separator including a semicircular belt curve with a conveyor belt incoming at an incoming-side curve radius and outgoing at a diametrically opposite, outgoing-side curve radius defining a diametrically opposite curve radii; said semicircular belt curve having a circular arc section and said first conveyor randomly discharging the parcels into said circular arc section;

said second conveyor for removing singled parcels adjoining said belt curve at said outgoing-side curve radius and at a periphery of said belt curve; and a return device for returning to the belt curve any parcels not directly removed from the belt curve in singled condition, said return device being disposed adjacent said diametrically opposite curve radii and adjacent said second conveyor.

2. The apparatus according to claim 1, wherein said belt curve spans an angle of substantially 180°.

3. The apparatus according to claim 1, wherein said belt curve is a first belt curve, and wherein said return device comprises a second semicircular belt curve, said second belt curve including a conveyor belt drivable in the same direction as said conveyor belt of said first belt curve, and said second belt curve having a rectilinear diameter side directly adjacent the rectilinear diameter side of said first mentioned belt curve defined by said diametrically opposite curve radii, wherein an incoming-side radius of said second belt curve adjoins the outgoing-side radius of said first belt curve, and an outgoing-side radius of said second belt curve adjoins the incoming-side radius of said first belt curve.

4. The apparatus according to claim 3, wherein said second belt curve defines a conveying plane, said conveying plane being pivotally mounted about an articulation axis extending approximately at right angles to a center thereof, relative to a conveying plane defined by said first belt curve, such that the outgoing-side radius of said conveyor belt of said second belt curve is disposed below said outgoing-side radius of said conveyor belt of said first belt curve.

5. The apparatus according to claim 3, wherein said second conveyor has a given width, and said second belt curve having a diameter which is smaller than a diameter of said first belt curve by approximately the given width of said second conveyor.

6. The apparatus according to claim 5, wherein said second belt curve is disposed center-offset relative to said first belt curve, and said second belt curve extends from said second conveyor to an outer periphery of said first belt curve.

7. The apparatus according to claim 5, which further comprises a support surface disposed adjacent said second belt curve, said support surface being inclinded relative to said second belt curve for returning any parcels to said second belt curve which have not been directly removed from the second conveyor.

8. The apparatus according to claim 7, wherein said support surface is an inclined roller track.

9. The apparatus according to claim 8, wherein said roller track is a motor-driven roller track.

10. The apparatus according to claim 1, wherein said semicircular belt curve is a first belt curve and said second conveyor for removing singled parcels from said first belt curve extends uphill away from said first belt curve.

11. The apparatus according to claim 1, wherein said semicircular belt curve is a first belt curve and wherein said return device comprises a second belt curve said second conveyor for removing singled parcels from said first belt curve extends approximately at a tangent away from said second belt curve at an outer peripheral region thereof.

12. The apparatus according to claim 1, wherein said semicircular belt curve is a first belt curve and said first conveyor for delivering parcels discharges at a tangent into said first belt curve.

13. The apparatus according to claim 1, wherein said semicircular belt curve is a first belt curve and said first conveyor for delivering random parcels discharges into said first belt curve in a direction traverse a direction of travel of said conveyor belt of said first belt curve.

14. The apparatus according to claim 1, wherein said semicircular belt curve is a first belt curve and said first conveyor is one of a plurality of conveyors discharging into said first belt curve.

15. The apparatus according to claim 1, wherein said first and second conveyors are belt conveyors.

16. The apparatus according to claim 1, wherein said first and second conveyors are roller conveyors.

17. An apparatus for singling randomly delivered parcels, comprising:

a first conveyor transporting a random stream of parcels, a central separator receiving the random stream of parcels from said first conveyor, and a second conveyor removing the parcels from said central separator in singled condition;

said central separator including a rotary conveyor on which the parcels received from said first conveyor are delivered to said second conveyor, said rotary conveyor including a first semicircular belt curve having a given diameter, and a second semicircular belt curve having a diameter smaller than said given diameter approximately by a width of said second conveyor;

said second conveyor for removing singled parcels adjoining said first belt curve at a peripheral region thereof.

* * * * *